Figure 1:
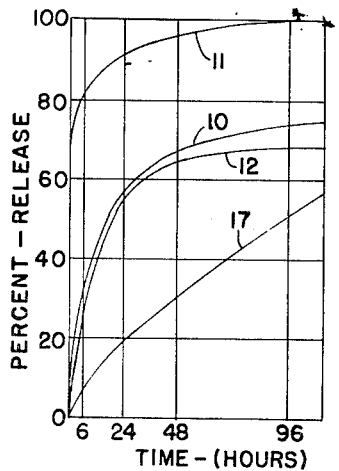

Dec. 14, 1965  L. I. HANSEN  3,223,518
GRANULAR FERTILIZER HAVING A PLURALITY OF COATINGS
AND THE PROCESS OF MAKING
Filed Aug. 18, 1961  4 Sheets-Sheet 2
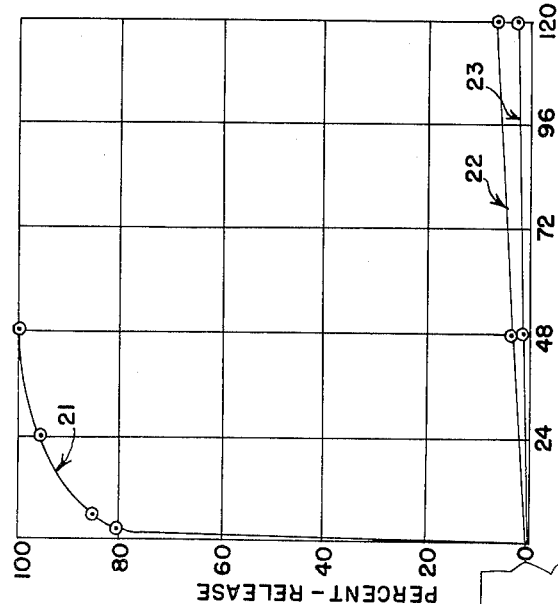
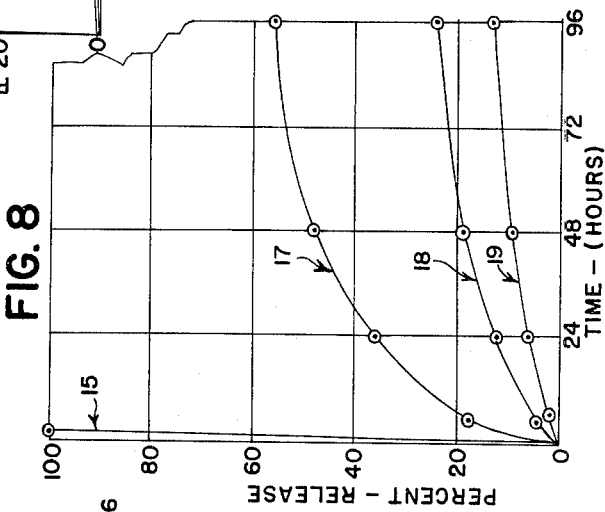
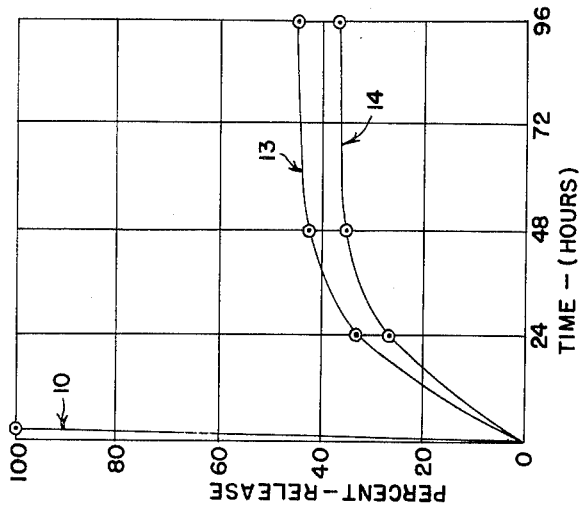
INVENTOR.
LOUIS I. HANSEN
BY
ATTORNEYS Dec. 14, 1965  L. I. HANSEN  3,223,518
GRANULAR FERTILIZER HAVING A PLURALITY OF COATINGS
AND THE PROCESS OF MAKING
Filed Aug. 18, 1961  4 Sheets-Sheet 3
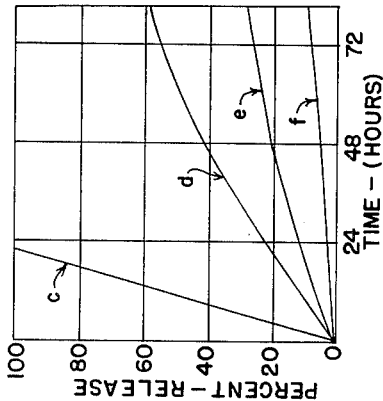
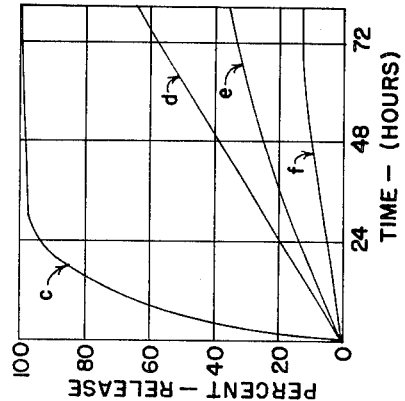
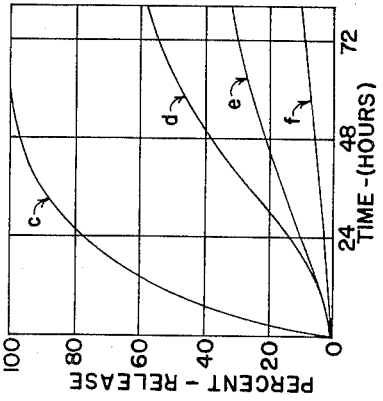
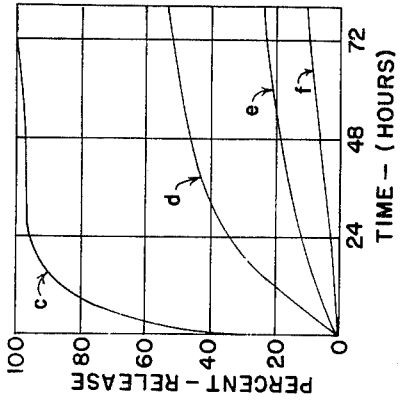
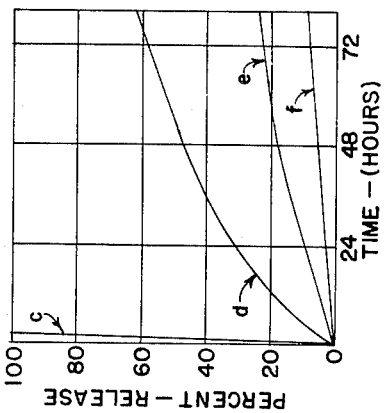
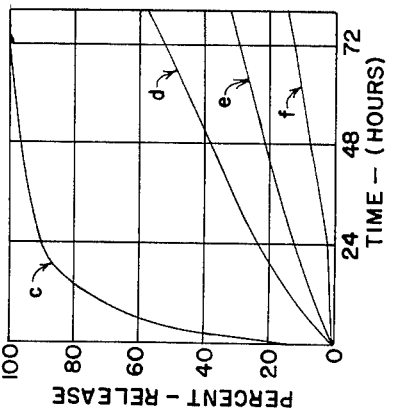
*INVENTOR.*
LOUIS I. HANSEN
BY Alton V. Oberholtzer
ATTORNEYS

*INVENTOR.*
LOUIS I. HANSEN

BY Alton V. Oberholtzer

ATTORNEYS

United States Patent Office 3,223,518
Patented Dec. 14, 1965

3,223,518
GRANULAR FERTILIZER HAVING A PLURALITY OF COATINGS AND THE PROCESS OF MAKING
Louis I. Hansen, Minneapolis, Minn., assignor to Archer-Daniels-Midland, Minneapolis, Minn., a corporation of Delaware
Filed Aug. 18, 1961, Ser. No. 132,383
9 Claims. (Cl. 71—64)

This application is a continuation-in-part of United States application Serial No. 846,088, filed October 13, 1959, now abandoned.

The present invention relates to coated fertilizers and the preparation thereof. In one aspect, the present invention relates to fertilizer products comprising a core of fertilizer (e.g., in granular, pelletized or prilled form) which is surrounded by a plurality of coatings. The coatings delay and effect a gradual release of the water soluble plant nutrients contained in the fertilizer. The coatings also facilitate handling and storage of the fertilizer. Typically, these coatings each amount to from about 0.25 to 10% by weight based on the weight of the core. These coatings can be of such materials as pitch, asphalt, various drying oil materials, resinous materials, blends thereof, and the like. Preferably, at least one of these coatings is of curable copolymer of dicyclopentadiene and ester of unsaturated acid. In one especially preferred embodiment, all of the coatings are of such a copolymer.

The general desire for delayed action high analysis fertilizers is not new. However, an economical and satisfactorily coated prefabricated fertilizer granule has not heretofore been satisfactorily accomplished. It is known in the art that certain granular fertilizer coatings have non-caking properties when treated with special clays, resins, and silicates, as represented by Studebaker, U.S. Patent No. 2,702,747, Rohner, U.S. Patent No. 2,502,996, British Patent Nos. 785,645 and 785,943, and Rinkenbach, U.S. Patent No. 2,660,541. Further, Pierce, U.S. Patent No. 2,500,700 indicates utilizing methyl silicon chloride to provide initial water resistance, but solubility in bulk water. Each of these do not properly afford useful delayed action when subject to abnormally wet conditions and for any length of time over a plant cycle.

In addition, synthetic granular fertilizer materials have been formulated by adhering trace elements to quartz granules with organic and inorganic binders as shown in Pole, U.S. Patent No. 2,806,773, or synthetically producing granulated materials of asphaltic emulsions formulated with water soluble salts, as shown by Daris, et al., U.S. Patent No. 2,829,040 and the like. These are special products, of special manufacture, and do not provide the proper delayed action for the nutrients required and obtained from the more economical high analysis fertilizer materials useful for farm application and large land tracts, such as urea, ammonium nitrate, triple super phosphate, super phosphate, diammonium phosphate, 20–10–5, 16–8–8, 10–10–10, etc.

Aside from the granules indicated coated to prevent caking, and the more expensive specialty fertilizers, there are available the commercially prepared high-analysis fertilizers for more general and practical use on crop lands. These high-analysis fertilizers contain essential plant nutrients in the form of water soluble derivatives of nitrogen, phosphorus and potassium, in varying amounts and proportions of each. These essential plant nutrients are prefabricated, in granular form, either as single components or blends, including diluents and other additives, and generally are in a more or less acidic state. Such fertilizer granules are frequently non-uniform in composition, contain surface cracks and crevices and tend to pulverize readily. Surface absorbency compounds the difficulty in obtaining a uniform and practical coating having the resistance to water essential in providing a controlled feeding of plant nutrients.

In addition, many other problems present themselves in manufacturing, marketing, and using these fertilizers. For example, there has been a problem with respect to rejection by inspection agencies of large quantities of shipped and stored high-analysis fertilizer because of non-uniformity of the granules both in particle size and in chemical composition. This is attributable primarily to powdering, particle segregation and caking during handling, storage and shipment, creating problems in shipping and subsequent application of such prefabricated high analysis fertilizer materials. Further, the fertilizer user encounters problems in applying the high-analysis fertilizers, as they are often acidic and hygroscopic in nature and damage fertilizer spreading machinery by corrosion, necessitating frequent troublesome and costly cleaning, maintenance and repair. Fertilizer dust quickly and readily corrodes the machinery of the spreader. Further, when the fertilizer stands in the spreader for even a short time, the feeder mechanism becomes clogged and must be cleaned immediately and with great particularity. In the event of exposure to humid or moist conditions, high-analysis fertilizers, because of their hygroscopic nature, lose their free-flowing properties, spread unevenly and may even become caked.

With these high-analysis fertilizer materials, it is generally recognized that several light applications of fertilizer are preferable to a single heavy application during seeding. A heavy application tends to burn the roots and is usually detrimental to proper plant growth. The recommended application schedule, of several light applications, is seldom followed in practice because of added labor costs and inability to move spreader machinery through the field without crop damage. Accordingly, a single initial light application usually is applied.

Consequently, there is need for improved high-analysis fertilizer materials which furnish a more controlled initial release of water soluble plant foods for early root growth and subsequently a relatively gradual release for later plant growth and development.

Therefore, an object of this invention is to overcome the problems stated above and provide prefabricated high analysis fertilizer granules with an encapsulating coating which is not water-soluble and remains essentially intact in bulk water over a plant growing cycle and which proportionally controls a dissolution and release of the water soluble salts from the granules supplying plant nutrients.

Another object of this invention and improvement in the art of fertilization is to provide encapsulated prefabricated high analysis granular fertilizer materials which exhibit resistance to physical, chemical and micro-biological soil environments and which control and allow initial and slow gradual plant nutrient release from the prefabricated granulated, pelleted, or prilled fertilizer material during normal root growth and development.

Another object of this invention and improvement in the art of fertilization is to provide prefabricated granulated and pelleted high analysis fertilizer materials with a coating which impregnates and encapsulates the granule in a water-insoluble jacket to prevent powdering of the granules and pellets on shipment, segregation or separation on handling, and which provides, on application to soil, an initial limited release with continued gradual release of the water-soluble plant food components during a seasonal growing period.

A further object of this invention is to provide economically coated high-analysis fertilizer materials and fertilizer mixtures which are applicable in a single application to provide available plant foodstuffs in a controlled relationship over a prolonged period, first to furnish the nitrogen in sufficient proportions during early plant growth and then a more gradual release of nitrogen, phosphorous and potassium over the period of subsequent root growth and fruit development for increased crop yields.

Another object of this invention is to provide suitable coating materials and the coating method therefor to permit economical production of improved coated granulated, pelleted, and prilled commercial high analysis fertilizers, both single and multi-component, which are characterized by irregular absorbent and adsorbent surfaces of peaks and crevices, heterogeneous particle size, high acidity, and a variety of different chemical crystalline surfaces.

A further object of this invention is to provide a method of fertilization with encapsulated high analysis fertilizer material having water insoluble coatings that afford an initial partial release of plant nutrients and then a gradual, slower controlled release over an extended period constituting plant growth and development cycles.

Yet another object of this invention is to provide prefabricated and pelleted high analysis mixed fertilizer materials as well as individual water soluble fertilizer components such as urea, potassium chloride and other potassium compounds, and ammonium nitrate for either fertilizer or explosive use, which can be immersed in soil or water for prolonged periods without substantial dissolution and which can be released at predetermined rates.

To the accomplishment of the foregoing and related ends, this invention then comprises the features of improvement hereinafter fully described and further exemplified in the drawings, the following description setting forth in detail certain illustrated embodiments of the invention, these being indicative, however, of but a few of the various ways in which the principle of this invention and improvement may be employed.

To more adequately illustrate the description and characterize the objects, advantages and utility of the desired delayed action fertilizer materials with the illustrated and exemplary coatings provided therefor and as hereinafter claimed, the accompanying illustrative graphs demonstrate, by comparison delayed action coatings on high analysis fertilizer material as embodied herein.

In accordance with this invention, the aforementioned objects are achieved by providing a high analysis fertilizer granule, particle or pellet with plurally applied coatings, i.e., coating applications, of an organic film forming material, the outermost coating being further characterized as an adherent, water insoluble, non-hygroscopic organic resinous encapsulating coating. The initial coating or coatings, as used herein are also referred to as "primer," and the subsequent coating or coatings are "encapsulating coatings." It is to be understood, however, that the primer and encapsulating coatings may be prepared from the same organic film forming resinous material. It is further to be understood that the resultant plurality of coatings on the ultimate encapsulated fertilizer granule are not necessarily readily perceived as discrete.

Although the release and dissolution of water soluble fertilizer material depends in part on the properties of the coating materials, it is significant that an increase in total coating weight alone does not necessarily provide increased control of plant nutrient release. In distinct contrast to uncoated or singly coated fertilizer particles, even with coating weights (based on fertilizer weight) up to 40 percent, the useful plurally applied coatings of this invention have not more than a 55 percent release of water soluble plant nutrients in 72 hours and not less than 0.05 percent release of such nutrients in 120 hours. Moreover, the rate of release can be controlled within the desired range by the proper selection of total coating weight and the plural application technique for these incremental coatings.

The plural or incremental coating technique requires careful control of the coating weight increments. Depending on the nature of the uncoated granule surface, various pretreatments may be desirable to improve adhesion of the initial primer coating, particularly in the case of highly crystalline materials such as potassium chloride. Such surface preparation is not essential, and the initial primer coating may contain such materials as diatomaceous earth, finely divided asbestos, etc., to enhance adhesion. To obtain the desired released characteristics, the initial or primer coating or coatings must be applied in increments of from 0.25 to 4 percent by weight of the uncoated granules and the subsequent encapsulating coatings or coating in increments of from 0.75 to 10 percent by weight of the uncoated granules, the particular techniques being hereinafter exemplified.

Fertilizer materials generally contain elements of plant nutritional value such as carbon, nitrogen, oxygen, phosphorus, sulfur, potassium, calcium, magnesium, manganese, zinc, copper, boron, chlorine and other trace elements (reference is made to The Yearbook of Agriculture, U.S.D.A. 1957, p. 81), especially the prefabricated water soluble or soil activated compounds of nitrogen, phosphorus and potassium prepared as granular heterogenous aggregates of various crystalline form which are usually acidic in nature and which have porous, rough and glassy surfaces of irregular configuration. The particular granular aggregates with which this invention is concerned also include such single component fertilizer and explosive ingredients as ammonium nitrate, urea, potassium chloride, etc., as well as formulation ratios of essential ingredients classified as high analysis fertilizers. Such materials containing N, $P_2O_5$ and $K_2O$ are herein exemplified by the well-known designation 8-24-12, 8-8-6, 5-20-20, 12-12-12, 14-16-0, 4-8-6, 3-9-6, 39-0-0, 9-39-0, all of which may contain supplementary additives such as trace elements, iron salts, insecticides, herbicides, fungicides, etc. The plant nutrients may also be impregnated on or admixed with inert materials, e.g., silica, coke, etc.

The organic primer coating materials include such organic film forming compounds as linseed oil; bodied linseed oil; copolymer oils such as dicyclopentadiene copolymer of bodied or unbodied linseed oil; long, medium and short oil alkyds; varnishes; phenol formaldehyde resins; furfuryl alcohol resins; urea formaldehyde resins; butadiene linseed oil copolymers; dicyclopentadiene soybean oil copolymers; resin modified alkyds; heat treated or blown oils; alkyds prepared from isophthalic acid materials at various drying oil lengths; silicone alkyds; copolymer alkyds prepared from dicyclopentadiene, styrene, acrylates, and the like; esters of rosin, glycerol, pentaerythritol and other polyols; depolymerized Congo resins and esterification products thereof; phenolic and modified phenolics; modified maleic resins; coumarone-indene resins; terpene resins; petroleum resins, synthetic latices of polymers such as polyvinyl chloride, polyacrylate, polymethacrylate, polyvinyl acetate, copolymers of vinyl acetate and vinyl chloride, butadiene-styrene copolymers, butadiene-acrylonitrile copolymers, vinylidene chloride-vinyl chloride copolymers; melamine formaldehyde; mixed urea-melamine-formaldehyde; nitrocellulose; cellulose acetate; ethyl cellulose; condensation products of fatty dimer or trimer acids with diamines; epoxidized materials cured with acids, half esters or anhydrides; condensation products of epichlorohydrin and bisphenol cured with a polyamine; polyesters such as the reaction products of dibasic acids, glycols and styrene; poly siloxane such as the reaction products of silicone chloride with fatty alcohols and other alcohols; petroleum and coal tar pitches and asphalts forming resins when modified with drying and bodied drying oils, or "Epon," etc. Coatings including one or more of film forming organic solids melting above 150° F., such as paraffin, natural and synthetic waxes which may be blown or modified, behenyl behenate, fatty keto esters, dodecyl allophonate, triglycerides of hydroxy stearate or hydrogenated castor oil, polyvinyl stearate, and high melting polyethylenes are also useful.

The primer coats may be applied to the granules with preliminary drying of the granules. Many of the commonly employed water soluble fertilizers contain, for example, up to about 7½% by weight of moisture. Ordinary uncoated fertilizer granules are normally dried to a maximum moisture content of 2% as a critical prerequisite to proper handling, shipment and storage. The primer coating materials are preferably applied to the granules in fluid form either as a solution or dispersion in a suitable solvent such as mineral spirits (usually about 50% solids) to provide adequate and relatively uniform coverage of the granules. It is sometimes desirable to include minor quantities of a wetting agent in the primer coating composition, particularly when hydrophobic materials such as waxes, asphalts and pitch are used as primer coating materials. If the particle surface is smooth and crystalline (e.g., potassium chloride), clay or diatomaceous earth or finely divided asbestos added to the primer coating composition, preferably one-half to 1% by weight of the granules, assists in providing enhanced adhesion of the primer film both to the granular substrate and to the subsequent coatings. Such clays and diatomaceous earths may also be added to the primer coated granules before the primer coating has dried or cured, thereby permitting the application of a thicker, more uniform and more durable subsequent encapsulating coating or coatings and also preventing the lifting of the primer coat upon the addition of the subsequent coating. As mentioned earlier, the primer coating or coatings is applied within specified weight percent ranges, based on the uncoated granule weight. Each primer coating application constitutes from ¼ to 4 weight percent of the uncoated granule. Lesser amounts provide inadequate and non-uniform coverage, whereas larger coating application weights adversely affect the slow and controlled release of the fertilizer and plant nutrients in actual use. The total weight of all primer coatings is dependent on the size and surface configuration and nature of the granules. With a rough, relatively porous and irregular surface, a total primer coating weight of as much as 5 weight percent or more can be used to effectively prime the surface and fill the pores. If the surface is smooth, glasslike and crystalline, a lower total primer weight need be used to produce an effective substrate for subsequent encapsulating coatings (e.g., ¼ to ¾%), and the incorporation of clay or ceramic-like material is sometimes preferable in these instances. However, it is important that each primer coating be applied in increments of not more than about 4% by weight, preferably not more than about 3% by weight, of the fertilizer, with provision for drying at least to a semi-tacky state before the application of further increments.

The outer or encapsulating coating material must be non-hydroscopic and water insoluble in addition to being an organic hydrophobic film forming material, preferably resinous in nature. Thus, any of the primer coating materials mentioned earlier may be employed in the encapsulating coating, provided these added and critical requirements are met. For example, ordinary urea-formaldehyde resins, though suitable as a first or subsequent primer coating, cannot be employed as the outer or encapsulating coating because of their hydrophylic nature. The encapsulating coating is applied in liquid form, usually as a solution in a suitable solvent or as a dispersion. As with the primer compositions, solutions having at least about 50 weight percent solids are preferred for uniform coverage. However, it is important to select an encapsulating material that is adherent to the primed substrate, particularly when clays or diatomaceous earths are not employed to assist such adhesion. The resultant water insoluble encapsulating coatings thus are not observed to be substantially decomposed during the life of the encapsulated fertilizer granules, i.e., until essentially all of the desired water soluble materials can be released.

The single ingredient fertilizer materials, such as ammonium nitrate, urea, super phosphate, potassium chloride, etc., have relatively smooth particle surfaces and are thus desirably coated, both in the primer and the encapsulating coats, with lesser increments by weight than the relatively coarse, porous, high analysis multi-component fertilizers. The primer coatings are preferably applied in increments of from about ¼% to about 3% by weight of the granule and the encapsulating coatings are preferably applied in increments of from about ¼% to about 1% by weight. The use of clay, as mentioned earlier, can aid in improving adhesion, particularly of the outer encapsulating coating. With potassium chloride crystals a distinct improvement in water durability results is obtained when ½ to 1% clay is applied to the last primer coat before all of the solvent is removed during the drying operation and before the application of the outer encapsulating coating, thereby achieving about 2% release or less after 24 hours immersion in water. This is also substantiated by experimental data on ammonium nitrate, which in such coated form is unique as both a fertilizer material and as a water resistant explosive. Ammonium nitrate granules coated in a "one coat technique" with from 1 to as much as 40 weight percent of waxes, asphalts or resins still do not give controlled release when immersed in water for any practical interval. For example, ammonium nitrate coated with in excess of 10% molten wax gave a product which rapidly released the encapsulated ammonium nitrate upon immersion in water. In contrast thereto, a plurally coated ammonium nitrate can be provided in accordance with this invention which releases less than 3% in 24 hours, and less than about 10% in from 96 to 120 hours of water immersion. Moreover, such coated ammonium nitrate does not require the use of any hazardous coating or binding materials, such as dynamite or nitrocellulose.

It is frequently desirable to include certain additives in the primer and/or the encapsulating coatings, including various wetting agents, plasticizers (e.g., dioctyl phthalate), trace or rare elements, pesticides, herbicides, anti-bacterial agents, anti-fungal agents, transpiration agents, driers (e.g., paint driers), water soluble iron salts and chelates (e.g., iron chelate of ethylene diamine tetra acetate, 10% iron in ferrous form), etc. In the coating of urea, it is particularly desirable to include an urease inhibitor, such as phenyl mercuric esters and salicyl anilide and the like tending to minimize decomposition of the urea by urease enzyme found in the soil, resulting in the liberation of ammonia and subsequent splitting or cracking of the encapsulating coatings due to the internal pressure build-up.

Particularly outstanding results are obtained when the copolymers of dicyclopentadiene and glyceryl esters of highly unsaturated fatty acids, such as linseed oil, soybean oil, tung oil, certain fish oils, etc., are incorporated into any or all of the primer coats or the encapsulating coats. The particularly preferred dicyclopentadiene copolymers contain from about 18 to about 45 weight percent of dicyclopentadiene. These copolymers, especially when used in the primer coating, preferably contain minor amounts of a wetting or plasticizing agent provide for increased durability. They are applied in solvent solution (e.g., mineral spirits, etc.) to the water decomposable granules in increments of from about ¼% to about 3% by weight of the granule, followed by drying, until the total primer coating weight of from about 1½ to about 5% is attained and are thereafter applied in further increments, followed by drying, of from about ¼% to about 2% until the total number of such coating increments are sufficient to provide maximum release of about 55% in 72 hours immersion in distilled water, with a preferred minimum release of about 5% in 72 hours.

The following description and examples indicate the coated fertilizer of this invention with plurally applied coatings, including both single and multi-component granules. Those coated fertilizers having a controlled release of up to about 55% of the water soluble materials in 24 hours and up to about 75% in 96 hours, as measured by the water durability test set forth herein, are useful, but the preferred coated fertilizers have not more than a 55% release in 72 hours and not less than 0.05% release in 120 hours, as mentioned earlier.

In the coating process a pair of large drums were mounted to rotate on a pair of powered rollers. A centered opening was cut in the ends of drums provided with a plurality of screen baffles to obtain mixing and tumbling of the granular particles upon drum rotation. One drum was enclosed in a heated cabinet, the other drum operating at room temperature. Blowers were utilized to force heated air through the drum ends to heat the granulated fertilizer in the heated cabinet and to remove the solvent from final coatings substantially at room temperature and without excessively reheating the granules.

Illustratively, 12–12–12 fertilizer granules, with fines less than 20 mesh screen size removed, were added to the heated drum. The drum was rotated and the granules heated to a temperature of from 180° F. to 190° F. after which 3% by weight of 60% styrenated short oil, soybean alkyd cut to 50% solids with a solvent of a high Kauri-Butanol value, as xylene, was added to the heated granules. This coating contained drying agents, as 1.5% lead and 0.15% cobalt driers on solids basis.

Thorough mixing was obtained by continued tumbling for about 20 minutes, or until all of the sealant was absorbed. This provided the granules with an appearance of a relatively uniform coating. An air stream was blown through the drum for more rapid removal of solvent. After an appearance of thorough wetting, the granules were tumbled for an additional 15 minutes at 180° to 200° F. to assure more complete removal of solvent and cure of the coating. Thereafter, the drum of treated granules was placed on the rolls at room temperature and rotated about 15 minutes, or until the coated granules were cooled down and relatively tack free.

For the initial primer coating, about a 50% film forming solids solution is preferred. However, dependent upon the granule structure, temperature, the drying time, and other physical factors, the application of a primer coating is controlled to a suitable desired flow viscosity for penetration into the crevices by adustment of solvent level. The primer coating material was applied by simply adding the film forming liquid to the granules as they were tumbled. Preferably, the addition is by spraying the liquid primer over the granules as they are tumbled. In initial application, best penetration and wet coverage of the granules are secured when the granules are hot. It will be recognized that for some film forming acid masking primer coatings this heating eliminates the need for wetting agents and a solvent, which lessens the chance of lifting the primer coating upon the subsequent addition of the necessary further sealant coating material.

After application and drying to at least incipient gelation of the first exemplified primer and partial sealant coating the granules were further tumbled in the rotating drum and 2% by weight phenol-formaldehyde resin (at 70% solids in ethyl alcohol solvent) was added. The fertilizer granules were tumbled for about 30 minutes while using a forced air stream to remove the solvent and dry the coating to a tack free condition, the drying rate and tumbling action being controlled to prevent "balling" or agglomeration of the granules. After about 12 to 18 hours aging, these coated granules were tested in the manner herein provided.

In optimum coatings, the drying rate is controlled by altering such variables as drying temperature, air volume throughout, tumbling speed, etc. Preheating the granules before addition of primer is preferred (up to the baking temperature of the coating material) and temperatures between 150° F. and 350° F. have been successfully used. Preheating of granules and hot coating is therefore generally employed with the primer materials and can also be employed in subsequent coatings. At the higher coating temperature, the coating materials are desirably applied from higher boiling solvents, e.g., kerosene, etc. to prevent excessive drying rates and poor coverage of the granules. Excessively low drying rates should be avoided to prevent "balling" or granule agglomeration.

The phenol-formaldehyde utilized in the above description was an acid catalyst prepared resin of the "Novolak" character utilizing 0.8 part formaldehyde to 1 part phenol as conventionally prepared in the B stage. No additional acid catalyst is added to the coating solution, as it is desirable only to dry the coating with warm air without adding additional heat which would effect a lifting action on the primer coating. As herein indicated, this type coating is described in Stark Patent No. 2,807,556, and may be applied as the primer of sealant in a suitable solvent. The primer coatings may or may not include added catalyst, as the primer is preferably applied under heated tumbling conditions, as described.

The drying of the encapsulating sealant coating or coatings will be facilitated and depend upon the amount of solvent, volatility of the solvent, and the temperature and size of the batch. This second coating and any additional coatings provide an encapsulating water insoluble jacket enclosing the water-soluble plant nutrients and primer coating. It is important, however, that subsequent coatings are not applied until the preceding coating has been dried to at least the point of incipient gelation.

As exemplified by line 10 in the graph FIG. 1, the application of the above described coating to the 8–24–12 high analysis fertilizer provided a water soluble release under the severe conditions of testing that shows an initial release of plant nutrients in an amount of less than 55% in the first 24 hours, less than 70% in 48 hours, and over a prolonged period a gradual slow release of water soluble or disintegrating plant nutrients of less than 75% in 96 hours, as compared to over 80% release in the first 6 hours and over 90% release in 24 hours of the standard uncoated high analysis fertilizer exemplified by line 11 in FIGURE 1. Because of relative differences in composition, some variation in the results will naturally occur. However, in all of the uncoated controls over 70% leach of plant nutrients occurred in the first 6 hours.

Similar coatings were applied in a similar manner to 8–8–6, 5–20–20, and 12–12–12 fertilizer granules of standard prefabrication and manufacture. In all instances except one, the release of plant nutrient over the 96 hour test was under 75% loss of water soluble and disintegratable salts, as compared to substantially a rapid total release in the first 1 to 6 hours and relatively 100% release in the standard control for the 96 hour period.

Figure 2:
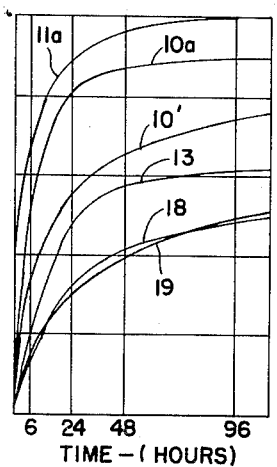

The line 10a, compared to the control 11a, in FIG. 2, shows the results of coating 8–8–6 first with 3% of the styrenated alkyd and 2% phenol-formaldehyde and making a test immediately after final drying. The initial release of plant nutrients was less than 55% in the first 6 hours, about 80% in the first 24 hours and thereafter a slow gradual release of less than 90% plant nutrients in 96 hours. While some improved results are shown by line 10a, much better retention, within the preferred exemplified ranges are obtained, by permitting the coatings to age, for a period of time before testing or use. The line 10' shows the improvement when the same coating is allowed to age for about a week before testing.

Figure 3:
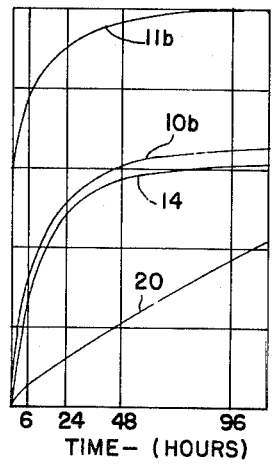
Figure 6:
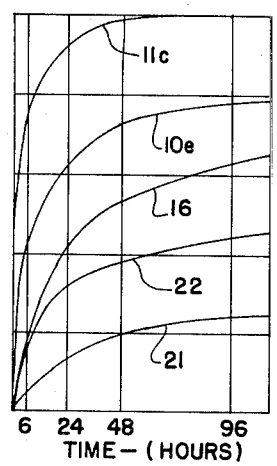

In FIG. 3, the line 10b, compared to control line 11b, illustrates a similar aged coating, applied to 5–20–20 high analysis fertilizer material. As compared to an uncoated control the release of plant nutrients was in the preferred range of under 55% in a period of 24 hours, not more than 60% in a period of 48 hours and under 75% in a period of 96 hours. In FIG. 6, the line 10e illustrates a similar coating applied to 12-12-12 high analysis fertilizer material. In each instance the fact that a portion of the plant nutrients remained after a period of 96 hours under the severe wet conditions prevailing for the test shows, by comparison with the control, the improvement provided by application of a plurality of coatings, forming a water-insoluble encapsulating jacket to materially effect the critical slow down in release of plant nutrients from prefabricated granular high analysis fertilizer materials. As hereinafter exemplified the coatings are applicable in different and alternative relationships.

WATER DURABILITY TEST

A reliable water durability or water solubles release test for the coated and uncoated prefabricated high analysis fertilizer material has been developed which overcomes the formation of saturated solutions that prevent accurate testing. The test requires periodically changing the water over the granules as the tests are made. The procedure is as follows: Place 20 grams of fertilizer in a 100 ml. closeable container and cover with distilled water. After standing for 6 hours decant off the liquid solution and wash the residue with distilled water to make up 100 ml. of decanted solution. Extract a 10 ml. aliquot portion of this solution and evaporate to dryness and weigh. This provided a measure of the amount and percent of solubles that were released in this time period. To the solid residue remaining in the container add 100 ml. of more coatings. The application of the additional coatings, following the drying of the previous coating, may be by the same procedure used to apply either the primer or sealant coatings, with the final coating preferably applied at nearly room temperature. Otherwise, the additional coats may be applied by using suitable solvents in a manner to prevent lifting the primary or underlying coating. It is contemplated herein that for the high analysis fertilizer materials, the coatings are sequentially applied, by spray or other application in the long drying chutes and drying drums used in conventional commercial production of the prefabricated granules. Accordingly, it will be readily recognized that high analysis fertilizer granules having the following coatings, applied by techniques illustrated, will afford a time delay in feed of plant nutrients in the manner illustrated in the graphs.

Table I

Figure 4:
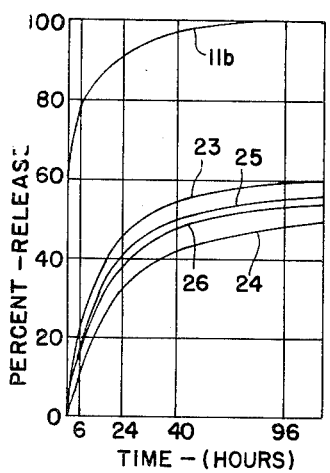

| Fertilizer | Multiple coating weights | | | Results |
|---|---|---|---|---|
| 8-24-12 | 2% alkyd | 2% phenol-form | 1% alkyd | Fig. 1, line 12. |
| 8-8-6 | do | do | do | Fig. 2, line 13. |
| 5-20-20 | do | do | do | Fig. 3, line 14. |
| 5-20-20 | do | do | do | Fig. 4, line 25. |
| 12-12-12 | do | do | do | Fig. 6, line 16. |

These coatings were applied and tested in the manner described above. The final alkyd coating was applied at room temperature in a suitable volatile solvent. The light coating spread easily and dried rapidly under the tumbling conditions at room temperature and an air stream for vaporization and removal of solvent.

To show increased improvements in high analysis fertilizer material provided with additional and multiple coatings and their comparative evaluation under the conditions described, the following coatings on high analysis fertilizer and results are illustrated.

Table II

| Fertilizer | Multiple coatings by weight | | | | | | Leach test |
|---|---|---|---|---|---|---|---|
| 8-24-12 | 2% alkyd | 2% phenol-formaldehyde | 1% alkyd | 1% phenol-formaldehyde | 1% alkyd | | Fig. 1, line 17. |
| 8-8-6 | 3% alkyd | do | 2% alkyd | 2% phenol-formaldehyde | do | | Fig. 2, line 18. |
| 8-8-6 | 2% alkyd | do | 1% alkyd | 1% phenol-formaldehyde | do | | Fig. 2, line 19. |
| 5-20-20 | do | do | do | do | do | | Fig. 3, line 20. |
| 12-12-12 | do | do | do | do | do | | Fig. 6, line 21. |
| | 3% alkyd | do | 2% alkyd | 2% phenol-formaldehyde | do | | Fig. 6, line 22. | distilled water and allow to stand for the next extraction. This procedure was continued at the 24, 48, 72 and 96 hour periods. The residue remaining from each of these extractions gave reliable results as to the initial and continued release of plant nutrients. Thus a comparison between the durability of encapsulated granules and uncoated control fertilizers is obtained. After the tests the coatings appeared intact and with solids remaining in the shell-like water insoluble exterior coverings. The usefulness of the improvement in providing prefabricated high analysis fertilizer material with water-durable and relatively encapsulating water insoluble coatings is exemplified by the plotted results of the different coatings herein exemplified. The graphs also provide a determinative yardstick for evaluating the improvement herein provided for prefabricated high analysis fertilizer materials.

FURTHER ILLUSTRATIVE COATINGS AND COATING PROCEDURES FOR MULTICOMPONENT GRANULATED FERTILIZER

To further provide prefabricated granular high analysis fertilizer materials with still more durable coatings, it is preferred to supplement the earlier described double coating on the fertilizer with an additional coat or coatings. When such additional coats are to be added, it is preferred to use a lighter first primer and partial sealant coating and different second and/or alternate third and The coatings were applied alternately in the manner herein described. After a few days storage the coated high analysis fertilizer materials were tested and showed under a 35%, and about a 30% release of plant nutrients over a 24 hour period of test. The resultant continued and relatively slower release of plant nutrients is illustrated by the additional test period of up to 96 hours and more. The results of the tests showed the coated fertilizer material in Table II to have less than a 60% release in the 96 hours as compared to 100% release in the same period for the uncoated control lines 11, 11a, 11b and 11c for FIGURES 1-6.

While it has been found that coating weights of from ¼% up to 4% for the primer may be applied and ¼% to about 10% for the subsequent coatings, it is illustrated by lines 21 and 22 in FIG. 6, that an increase in coating weight does not necessarily mean an increase in resistance to release of plant nutrients and correspondingly greater duration of feed of plant nutrients. In addition, by comparison the application of a 4% by weight coating of urea-formaldehyde, as a single coating, or in application of a first coating of 3% by weight urea-formaldehyde and then 2% by weight urea-formaldehyde resulted in over an 80% release in two hours and almost a total release in 24 hours. On the other hand, single coatings of from 1% to 5% by weight phenolformaldehyde showed over 60% release of plant nutrients in only a few hours;

whereas, a double coating of water insoluble phenol-formaldehyde consisting of a first primer coat of 3% by weight followed by a subsequent encapsulating 1% coating by weight of phenol-formaldehyde showed an improvement in release by 50% less in the same time period.

To provide for further illustration of more improved multiple coated high analysis fertilizer materials having a still greater resistance to leaching, the following is illustrative of a plurality of coatings made on the 5–20–20, 8–24–12, 12–12–12 and 8–8–6 high analysis fertilizer materials.

*First primer and partial sealant coating.*—After tumbling a 1000 gram sample of 12–12–12 fertilizer for 30 minutes in a rotating drum and heated to 190° F., 33.3 grams of a 60% xylene solution of styrenated soybean oil alkyd containing 1.5% lead and 0.15% cobalt driers, was added to the rotating drum. The tumbling hot granules absorbed the coating uniformly over the surfaces of the fertilizer as the solvent was removed by hot air being forced through the drum. After tumbling for 30 minutes the coated granules were dry and tack free. The drum was removed from the heat and placed on the rollers at room temperature. With air being again forced through the drum during about 30 minutes rotation, the granules were cooled and ready for application of the second coating.

*Second coating.*—To the primary coated granules in the rotating drum was then added 28.6 grams of 70% solution of phenol-formaldehyde resin in ethyl alcohol. This vehicle readily wetted the coated granules and after tumbling for 5 minutes at a temperature of 80° F., air was forced through the drum to remove the solvent. It required about 20 to 25 minutes to remove the solvent and to produce a dry tack free coated granule.

*Third coating.*—The third coat was applied to the above coated dry granules at room temperature. 16.6 grams of xylol solution (50% solids) of styrenated soybean oil alkyd (containing 1.5% lead and 0.15% cobalt driers) was added to the previously coated granules and tumbled in the rotating drum. After 5 minutes of mixing the granules had been coated uniformly by this vehicle. The solvent was then removed by blowing air through the drum. These freshly coated granules were dry and tack free after 25 minutes of tumbling under these conditions.

*Fourth coating.*—The fourth coat of phenol-formaldehyde resin was applied next at a 1% coating level. This additional coating was applied to the above dried coated granules by adding 14.4 grams of a 70% solution of phenol formaldehyde resin in ethyl alcohol. This solution wets and readily coats the precoated granules as they tumble in the rotating drum. After 5 minutes of mixing all the vehicle appears to be absorbed on the granules and then air is forced through the drum. This removed the solvent and produced a dry and tack free coated granulated material after about 25 minutes continued tumbling.

*Fifth coating.*—A final coat of 16.6 grams of styrenated soybean oil alkyd was applied using a 60% solution in xylene (containing 1.5% lead and 0.15% cobalt driers). This coating was added to the previously coated dry granules while the drum was rotating at room temperature. This solution was rapidly uniformly absorbed over the above coated granules as they tumbled in the drum at room temperature. After 5 minutes of tumbling, air was forced through the ends of the drum, this rapidly removed the solvent. In a period of 25 minutes the solvent was completely removed and the final multiple coated granules were dry and tack free and ready for packaging.

Figure 18:
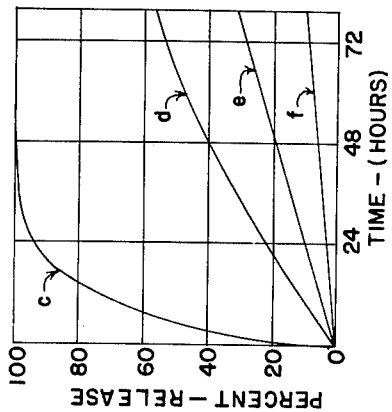

As heretofore indicated, reference to the graph lines 17 in FIG. 1, 18 and 19, in FIG. 2, 20, in FIG. 3, and 21 and 22 in FIG. 6 clearly show relative time delay in release of plant food and fertilizer food provided with the plurality of coatings in the relative ratios, by weight, as herein described.

As indicated earlier, the commercial method of standard fertilizer manufacture is to dry the granules to a moisture level down to about 2%. In general, the above has been illustrative of coating fertilizers of standard manufacture. However, it has been discovered that in the present application of a plurality of organic coatings, this low level of moisture is not a critical factor and accordingly the granules may contain up to about 7½% moisture, if desired. For example, the following table of coated fertilizers were provided at different moisture levels. The following coatings, after a few days storage, are shown to fall within the desired ranges of retaining plant nutrients over prolonged periods, as illustrated by the graph lines indicated.

*Table III*

| Fertilizer | Moisture level | Coatings | | | |
|---|---|---|---|---|---|
| 5–20–20 | 2% | 2% alkyd | 2% phenol-form | 1% alkyd | Fig. 4, line 23. |
| 5–20–20 | 5% | Same coating | | | Fig. 4, line 24. |
| 5–20–20 | 7½% | do | | | Fig. 4, line 25. |
| 5–20–20 | Under 2% | do | | | Fig. 4, line 26. |
| 8–24–12 | Over 2% | 3% bodied linseed oil | 2% urea-form | 1% alkyd | Less than 50% soluble salts leached in 24 hours. |

Figure 5:
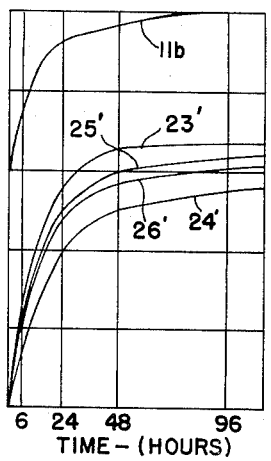

In FIG. 5, there is shown a similar coated fertilizer with substantially the same and corresponding results within the limits of preventing over about a 55% loss of plant nutrients in a period of 24 hours, and the low level of subsequent food of plant nutrients under the severe test conditions indicated. These low levels are clearly representative of how the life of the improved fertilizer is extended during a normal growing season. That is, there is provided a first plentiful supply when it is needed for the start of root growth and then a gradual and continual extended period of supply of plant nutrients during the plants growth cycle under normal conditions.

The critical factors for the optimum application of the two or more coatings which fully enclose and encapsulate the water soluble nutrients are:

(1) The primer coating is one not attacked by acid conditions, of sufficient fluidity and solids level to penetrate and adhere to the many crystalline and non-crystalline forms constituting the prefabricated granule aggregate; that the fines must be kept to a minimum for good surface coverage in the tumbling operation; the coating material must have relatively rapid drying properties and the solvent, if used, readily volatile either under normal temperature conditions or heat, as illustrated, and as will be recognized by those skilled in the art;

(2) The additional coating or coatings are preferably compatible with the underlying coating and should be carefully applied so as not to lift the underlying coating. The top sealant coating must enclose the primer and water soluble food nutrients in a water insoluble film for controlled water permeability. The solvents, if used, should not attack the underlying coating and be readily vaporizable under the temperature conditions employed.

The following are illustrative of coatings which have been applied and produced results within the suitable ranges exemplified by the FIGURES 1–6.

(a) A member of the commercially available prefabricated high analysis fertilizer granules were first coated with 1% to 3% levels of styrenated soya alkyds as a primer and partial sealant and then further coated with one and more of the following coatings: 1 to 2% of 80/20 ratio of paraffin (138° F. melting point), cane wax (169–174° F. melting point), 1 to 2% dicyclopentadiene copolymer linseed oil varnish, and 1 to 2% medium oil length soybean oil alkyd;

(b) Similar fertilizer materials were first coated with 1 to 3% levels urea formaldehyde resin as a primer coating followed by the application of one or more of the following water insoluble organic film forming sealant coatings: 1 to 2% of high melting paraffin/blown wax in 95/5 ratio, 1 to 2% of chlorendic anhydride/epoxy linseed oil about 60/40 ratio, 1 to 2% of styrenated soya alkyds, 1 to 2% of dicyclopentadiene linseed copolymer varnish, 1 to 2% of phenol formaldehyde, and/or 1 to 2% of epoxy resin (bis-phenol epichlorohydrin);

(c) Similar fertilizer materials were first coated with boiled linseed oil containing 0.5% lead, 0.05% manganese, 0.3% calcium driers and after being air dried was provided with at least—and in many instances more of—the following coatings: 1 to 2% of high melting paraffin (138° F.) and cane wax melting point 169–174° F. in a 95/5 ratio, 1 to 2% of styrenated soybean oil alkyd, 1 to 2% of dicyclopenadiene linseed oil, copolymer varnish, 1 to 2% of expoxy resin (bis-phenol epichlorohydrin), 1 to 2% of chlorendic anhydride epoxy linseed oil 40/60 ratio, 1 to 2% of polyvinyl acetate latex, 1 to 2% of butadiene-styrene copolymer latex, and 1 to 2% of phenol formaldehyde resin;

(d) Similar of the several high analysis fertilizer granules were coated with 1 to 3% of levels of phenol formaldehyde resin and then coated with one or more of the following coatings: 1 to 2% of high melting paraffin wax (M.P. 195–200° F.) and blown wax in a 95/5 radio, 1 to 2% of chlorendic anhydride and epoxy linseed oil about 50/50 ratio (other epoxy animal, vegetable and marine oils and esters derived from the fatty acids of such oils having internal oxirane groups may be substituted for the linseed oil), 1 to 2% of styrenated soybean oil alkyds, 1 to 2% of dicyclopentadiene, linseed copolymer varnish, 1 to 2% of phenol formaldehyde, and 1 to 2% of epoxy resin (bis-phenol epichlorohydrin);

(e) Several of the high analysis fertilizer granules were coated with 1 to 3% by weight medium oil length soybean oil alkyd and then coated with one or more of the following coatings: 1 to 2% of phenol formaldehyde, 1 to 2% of high melting point pitch (M.P. about 340° F.) in a 90/10 ratio with a dicyclopentadiene copolymer of linseed oil, 1 to 2% of chlorendic anhydride and epoxy linseed oil 55/50 ratio, 1 to 2% of polyvinyl acetate, 1 to 2% of butadiene-styrene copolymer latex, and 1 to 2% of styrenated soya alkyd.

To exemplify coating of 2 or more of the above high analysis fertilizer material the following is illustrative:

To 1000 grams 12—12—12 fertilizer heated to 200° F. to 250° F. in the tumbling drum was added 20 grams of dicyclopentadiene-linseed oil copolymer in a 35/65 ratio contained in a mineral spirits solvent solution on a 50% solids level. After an appearance of thorough wetting tumbling was continued for about 30 minutes until the coating was hard and tack free. The granules were cooled down to about 140° F. and sprayed with a second coating consisting of 20 grams of a 50% alcoholic (ethanol) solution of phenol formaldehyde. Rotation was continued with a drying air draft for about 30 minutes with further cooling. When the coating appeared to be hard and dry a final coating of 20 grams of medium oil length soybean oil alkyd in a 50% solution in mineral spirits and/or xylol mixture was sprayed over and onto the tumbling granules. After about another 30–45 minutes of tumbling in an air draft the coatings appeared dry and tack free. The granules were allowed to stand for 15 to 20 hours and then tested. The test results showed that the coatings released water soluble nutrients within the preferred ranges. A mixture of about 5–20% xylol to the mineral spirits provided a faster drying rate under normal temperature conditions.

After proper application and removel of the solvent the coated granules are preferably aged for several days (about 1 week in this instance) to assure cure of the coatings before the tests were run. The two-coat systems provided, showed high water resistance and, after 24 hours exposure under the test conditions, showed on the average, a release of under 55% of the soluble salts. With three and more coatings the release was still further reduced from 45% to about 30% in the 24 hour test period. In all cases the release for 96 hours did not remove over about 75% of the water soluble and isintegrable salts and as the coatings were multiplied, considerably less release was present over the long test period.

In addition to the above, further encapsulating coatings were found to provide improved high analysis fertilizer materials of a more preferred character having not more than about a 30% leach in the first 24 hours, a 50% leach in the first 48 hours, and less than a 75% leach in 96 hours. The coatings were applied to the 5–20–20 granules and tested under the conditions described. The granules were provided with the following applied coatings:

Table IV

| Vehicle, 1st coat 3% | Sealant, 2nd coat 1% | Vehicle, 3rd coat 1% | Sealant, 4th coat 1% | Vehicle, 5th coat 1% | Sealant, 6th coat 1% | Vehicle, 7th coat 1% |
|---|---|---|---|---|---|---|
| Dicyclo copolymer varnish. | Urea form | Styrenated soya alkyd. | Phenol form | Urethane varnish | | |
| Mod. S.M.P.[1] | Phenol form | Urethane varn | Urea form | Soya alkyd med. oil. | | |
| | Urea form | Do | Mod. S.M.P.[1] | Phenol form | Soya alkyd med. oil. | |
| Urethane varn | do | Epon 1001 [2] | Phenol form | Copolymer alkyd latex (40–50%). | | |
| Do | do | Styrenated alkyd | Poly vinyl acetate. | Copolymer alkyd latex (40–50%). | | |
| Do | do | Do | Poly vinyl chloride. | Copolymer alkyd latex. | | |
| Linseed oil | do | Epon 1001 [2] | Phenol form | Urethane varn | | |
| Do | do | Do | do | Do | Polyethylene | |
| Dicyclo cop. oil | do | Soya alkyd med. oil. | do | Do | | |
| Do | do | Do | do | Do | Phenol form | Paraffin wax (M.P. 138° F.). |
| Med. Alkyd | Phenol form | Urethane varn | Copolymer alkyd latex (40–50%). | Epon 1001 | | |

[1] High melting asphalt or pitch modified with bodied linseed or tung oil, styrenated soya alkyd, or dicyclo copolymer varnish or copolymer oil.
[2] Epoxy resin (Bis-phenol-epichlorohydrin).

As heretofore indicated, it is preferred to properly coat the prefabricated high analysis fertilizer materials with the small fines removed. This provides for an economy in coating materials and for uniformity in coating weights. However, in some less preferred instances the fines may also be included and with a corresponding slight increase in coating materials required by weight. In addition, the inclusion of fines requires more applications of coating material. Therefore, it is preferred to remove the dust and extremely fine material, as indicated, before application of the primer and sealant coatings, as described.

To illustrate a field test, several of the above mentioned coated fertilizers were plentifully distributed in trenches beside planted corn hills in comparison with similar uncoated control samples. In each instance of the coated test, the plant roots grew thick and heavy through the trenches filled with coated fertilizer and the coated granules contained solid fertilizer material within the coating up into the late summer. In the control tests, the root growths did not approach the trench filled with uncoated fertilizer. This weakened the root strength and by comparison the trunk stocks appeared lighter and were not fully supported by uniform root growth. Further, the ears of the final corn crops, from the test plots, were visibly larger and the corn kernels appeared more uniform throughout and larger at an earlier ripening stage. At the end of the growing season the hulls which formed the encapsulating coverings for the fertilizer could still be seen and due to their organic nature will be decomposed by microbial action in the soil. The unexpected and surprising benefit obtained was a preservation of the phosphate in a water leachable and plant digestible state for the prolonged period. That is the phosphate was not rendered insoluble and converted to a non-plant assimilating state. A continuous slow supply is thereby fed to the plant roots which they can assimilate and digest.

MULTIPLE COATING OF SINGLE COMPONENT FERTILIZERS

The following coatings and procedures are illustrative of preferred coating materials and their application to single component fertilizer materials such as ammonium nitrate, urea, potassium chloride, etc.

Prilled ammonium nitrate was screened through an 8–20 mesh screen to remove the fines and larger granules. A 25 pound batch of the screened ammonium nitrate was placed in a rotating drum (16″ diameter, 30″ length) with 8″ annular openings in each end. The drum rested on rollers and was enclosed in an air heated chamber, the temperature of which was 180°–250° F. After the granules were heated to about 160° F. and while the drum rotated at about 2–2½ r.p.m. there was sprayed onto the slowly tumbling granules a solution of a primer coating vehicle (50% solids in mineral spirits) containing 300 grams of a 38% dicyclopentadiene, 62% linseed oil copolymer modified with 34 grams of petroleum wax (150° melting point), 6 grams of epoxidized soybean oil with 0.1% cobalt and 1.0% lead naphtherate driers. The primer solids provided a coating of about 3% based on the original granule weight. During and after the primer application a stream of air, heated to about 250° F., was blown through the drum to remove the solvent, i.e., mineral spirits, and effect cure of the coating vehicle. About 10–15 minutes were required after spraying to effect removal of the solvent and after a further 20 minutes the coated ammonium nitrate granules were tack free. Using the same primer coating solution a second application of 2% by weight was provided in two 1% increments, with similar drying cycles after each application.

To the resultant primer coated ammonium nitrate granules a plurality of encapsulating coatings, totaling about 7% by weight of the original granules, was applied in increments of about ¼%–2% by weight. The encapsulating coating vehicle, a 38% dicyclopentadiene—62% linseed oil copolymer with 0.1% cobalt and 1.0% lead naphtherate and 10% of 18% dicyclopentadiene—82% linseed oil copolymer, in 50 weight percent of mineral spirits was sprayed onto the tumbling granules in the drums. Each increment was followed by a 20 minute air drying period before further coatings were applied. In some cases the drying air stream may be heated and filtered, if desired. The number of applications of coating vehicle provided depends upon the weight of each increment added with appropriate drying intervals between applications. Total coating weights of 8%, 10%, 11% and 12% provided water insoluble encapsulated ammonium nitrate which provided controlled release of the highly water soluble ammonium nitrate even after 120 hours of continuous immersion in water. After final drying of the coated granules a prolonged storage period may be used to further enhance the cure on low temperature drying. In high temperature drying, such aging is not necessary.

Urea granules have been similarly coated. Because of the smooth surface of the granules only 1½% of the above primer coating was employed in increments of 1% and ½%. Overcoatings or encapsulating coatings, as with the aforementioned ammonium nitrate granules, were applied in increments of ½% to 1% by weight until total encapsulating coating weights of 3, 5.5, and 9.5% were obtained. The same techniques of application with heating kept below decomposition temperature of urea and employing such incremental addition and a vehicle containing major amounts of dicyclopentadiene copolymers with various unsaturated fatty acid radical of oil molecules, e.g., linseed oil, etc., provide superior controlled release results with high analysis granulated fertilizers such as 10–10–10, 5–20–20, 8–24–12, etc., as will be discussed below.

The above and following data presented with respect to FIGURES 7–18, illustrate improved durability using higher coating temperatures of from about 200° F. to about 350° F. In utilizing such temperatures during initial heating and coatings application, it will be understood that the relative temperature of decomposition of the fertilizer and plant nutrient material is a controlling factor. Such temperatures as used in pre-heating or drying and curing should not be in excess of the temperature or temperatures of decomposition of the fertilizer or plant nutrient and coatings applied thereto. However, when the higher temperatures are used, it is discovered that the coatings are applied in an overall less time and with more rapid and thorough cure.

FIGURE 7 shows the water release results of urea granules coated as above described, utilizing a curing temperature maintained between 180° F. to 210° F., compared to the extremely rapid water solubilization of uncoated urea. Line 10 provides the leach results of uncoated urea. Lines 13 and 14 indicate the improved water leach characteristic of the above-coated urea granules with total coating levels of 5.5% and 9.5% respectively.

FIGURE 8 sets forth water leach data obtained with uncoated ammonium nitrate (line 15) and ammonium nitrate coated with the hereinafter described increments of dicyclopentadiene polymers to 10%, 11% and 12% total coating weight (lines 17, 18 and 19 respectively). Curing of the coatings was affected at about 250°. The effectiveness of the coated ammonium nitrate granules in resisting hydrolytic attack furthermore permits their use as coated explosives in mining fields, without the necessity for packaging and enclosing the granules in water-proof containers.

FIGURE 9 demonstrates the leach results achieved with high analysis 10–10–10 fertilizer with total coating weights of 11% and 12% (lines 22 and 23 respectively), using the dicyclopentadiene polymer vehicle, as described, contained in kerosene, a higher boiling solvent. These coatings were applied in increments, as described, and each increment cured at temperature levels ranging from 250° to 300° F. As noted, when the several coatings are applied in increments in greater than ¾% by weight, the plant nutrients are leached at a rate no greater than about 15% in 120 hours and thereafter at a gradual, controlled rate. Line 21 in FIGURE 9 represents the uncoated control.

DICYCLOPENTADIENE COPOLYMERS AS COATING MATERIALS

Particularly outstanding results have been achieved with coatings prepared from the copolymers of dicyclopentadiene and glyceryl esters of highly unsaturated fatty acids (e.g., linseed oil, soybean oil, tung oil, certain fish oils, etc.) as already mentioned. FIGURES 10–18 further illustrate the controlled release of nutrients obtained with these preferred systems. The coating material used was 38% dicyclopentadiene—62% soybean oil copolymers with about 10 weight percent of 18% dicyclopentadiene—82% linseed oil copolymers included. These vehicles were dissolved in mineral spirits at 50 to 70% solids and applied in increments, as described, and cured at a temperature level range at 220° F. and ending at about 270° F. when the last coating is applied. By using a higher boiling or solvent as kerosene, higher curing temperatures, from about 250° to 350° F., and higher, can be utilized, depending upon the thermostability of materials used.

FIGURE 10 shows the average release obtained with ammonium nitrate. Line C represents the uncoated control, line D represents 8% total coating (3% primer, 5% topcoat), line 3 represents 9% total coating (3% primer, 6% topcoat), and line F represents 10½% total coating (3% primer, 7½% topcoat).

FIGURE 11 shows the average release obtained with 0–46–0, line C being the uncoated control. Line *d* represents about 4% total coating weight (1½% primer, 2½% topcoat). Line *e* represents about 4½% total weight (1½% primer, 3% topcoat), and line *f* represents about 5% total weight (1½% primer, 3½% topcoat).

FIGURE 12 shows the average release obtained with 0–0–60 (potassium chloride), line *c* being the control. Line *d* represents about 5% total coating weight (1½% primer, 3½% topcoat). Line *e* represents about 6% total coating weight (1½% primer, 4½% topcoat), and line *f* represents about 7½% total coating weight (1½% primer), (5½% topcoat).

FIGURE 13 shows the average release obtained with 18–46–0 line *c* being the uncoated control. Line *d* represents about 5% total coating weight (2% primer, 3% topcoat). Line *e* represents about 5½% total coating weight (2% primer, 3½% topcoat), and line *f* represents about 8% total coating (3% primer, 5% topcoat).

FIGURE 14 shows the average release obtained with 20–10–5, line *c* being the uncoated control. Line *d* represents about 7½ total coating (3% primer, 4½% topcoat), line *e* represents about 10% total coating (3% primer, 7% topcoat), and line *f* represents about 11% total coating (3% primer, 8% topcoat). This same fertilizer material, prior to coating, was treated with a solution of iron sulfate to afford 0.1% soluble iron on the granules. The granules are then dried and applications of coatings applied, as above described. This affords a very slow release of soluble iron along with the other plant nutrients. Similarly other forms of suitable iron and other trace plant nutrient elements can be coated per se or more economically applied as salt or chelate compounds, to a suitable carrier inert thereto, and then the coating applications applied, as herein described.

FIGURE 15 shows the average release obtained with 16–8–8, line *c* being the uncoated control. Line *d* represents about 7½% total coating (3% primer, 4½% topcoat), line *e* represents about 9% total coating (3% primer, 6% topcoat), and line *f* represents about 11% total coating (3% primer, 8% topcoat).

Figure 16:
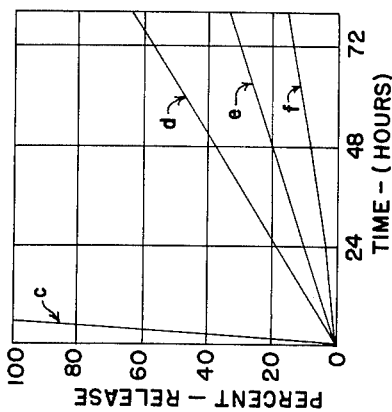

FIGURE 16 shows the average release rate obtained with urea (46–0–0), line *c* being the uncoated control. Line *d* repersents about 5% total coating weight (1% primer, 4% topcoat), line *e* represents about 8% total coating weight (1% primer, 7% topcoat) and line *f* represents about 11% total coating weight (1½% primer, 9½% topcoat).

Figure 17:
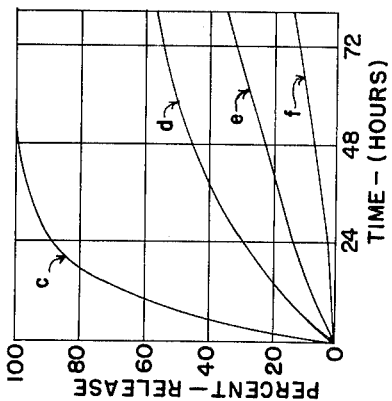

FIGURE 17 shows the average release rate obtained with 10–10–10, line *c* being the control. Line *d* represents about 7% total coating weight (3% primer, 4% topcoat), line *e* represents about 9½% total coating weight (3% primer, 6½% topcoat), and line *f* represents about 11% total coating weight (3% primer, 8% topcoat).

FIGURE 18 shows the average release rate obtained with 5–20–20, line *c* being the uncoated control. Line *d* represents about 4% total coating weight (2% primer, 2% topcoat), line *e* represents about 5% total coating (2% primer, 3% topcoat), and line *f* represents about 7½% total coating (2% primer, 5½% topcoat).

FIGURES 10–18 serve to illustrate that within the preferred release ranges, i.e., 0.1% to 55% in 72 hours, the coated materials can be prepared as durable (0.1%–1.5% in 72 hours), slow release (15%–30% in 72 hours) and moderate release (30–55% in 72 hours). Further variations may be obtained by admixing two or more different coated fertilizers of this invention to modify the characteristics for the climate and soil environment in which the materials are to be used.

It will be apparent from the foregoing disclosure that many modifications and variations of this invention may be made without departing from the scope thereof, and the specific embodiments are presented to illustrate and not to limit the invention.

What I claim is:

1. A fertilizer granule comprising a granular material having at least one water soluble plant nutrient, said granular material having a plurality of coatings of a cured copolymer of dicyclopentadiene and a glyceryl ester of an unsaturated acid containing 18 to 45% by weight of dicyclopentadiene; each of the coatings being in the amount of between about 0.25 and about 10% by weight based upon said granular material and the total coating weight being such as to provide an encapsulated granule having a maximum release in distilled water of about 55 weight percent of said water soluble plant nutrients in 24 hours, of about 70 weight percent of said water soluble plant nutrients in 48 hours, and of about 75 weight percent of said water soluble plant nutrients in 96 hours, and a minimum release of 0.05 weight percent of said nutrients in 120 hours.

2. A fertilizer product comprising:
   (a) a core of fertilizer material, said core having at least one water soluble plant nutrient,
   (b) a plurality of coatings surrounding said core, each of said coatings being in the amount of from about 0.25 to 10% by weight based on said core,
   (c) at least one of said coatings being cured coating of curable copolymer of dicyclopentadiene and ester of unsaturated acid, and
   (d) the total coating weight being such as to delay and effect gradual release of said water soluble plant nutrient.

3. A fertilizer product comprising:
   (a) a core of granular fertilizer having at least one water soluble plant nutrient,
   (b) a plurality of coatings surrounding said core, each of said coatings being in the amount of from about 0.25 to 3% by weight of said core,
   (c) at least one of said coatings being cured copolymer of dicyclopentadiene and glyceryl ester of unsaturated acid, said copolymer containing from about 18 to about 45% by weight of dicyclopentadiene, and
   (d) the total coating weight being such as to delay and effect gradual release of said water soluble plant nutrient.

4. A granular fertilizer product comprising:
(a) a core of granular high analysis fertilizer having at least on water soluble plant nutrient selected from the group consisting of water soluble plant nutrient compounds of nitrogen, phosphorus and potassium,
(b) a plurality of cured coatings of coplmyer of dicyclopentadiene and soybean oil surrounding said core, each of said coatings being in the amount of from about 0.25 to 3% by weight of said core, and
(c) the total coating weight being such as to delay and effect gradual release of said water soluble plant nutrient.

5. A fertilizer product of the type described in claim 1 wherein said glyceryl ester comprises linseed oil and wherein each of said coatings amounts to from about 0.25 to 3% by weight of said granular material.

6. A fertilizer product of the type described in claim 1 wherein all of the coatings surrounding said granular material are of said copolymer.

7. A method for preparing a coated fertilizer granule to thereby delay and effect a gradual release of a water soluble plant nutrient contained in said granule, the method which comprises:
(a) heating granular fertilizer material containing at least one water soluble plant nutrient,
(b) applying a coating of a rapid drying solvent solution of curable copolymer of dicyclopentadiene and ester of unsaturated acid to said heated fertilizer granules,
(c) tumbling said fertilizer granules and drying said coating at least until the point of incipient gelation,
(d) repeating said application of said copolymer and said tumbling and drying at least one more time, and
(e) finally drying to completion the last applied coating to thereby form a water insoluble coating around said fertilizer granule.

8. A method of the type described in claim 7 wherein said ester is glyceryl ester of unsaturated fatty acid and wherein said fertilizer is given a sufficient number of coatings to provide a maximum release in distilled water of 55 weight percent of said plant nutrient in 24 hours and a minimum release of 0.05 weight percent of said nutrient in 120 hours.

9. A method of the type described in claim 8 wherein said ester comprises soybean oil and wherein said granular fertilizer is heated to from 150° to 350° F. prior to applying the first coating.

References Cited by the Examiner
UNITED STATES PATENTS

| | | | |
|---|---|---|---|
| 2,689,231 | 9/1954 | McKenna | 260—23.7 |
| 2,689,232 | 9/1954 | Gerhart | 260—23.7 |
| 2,806,773 | 9/1957 | Pole | 71—64 |
| 2,936,226 | 5/1960 | Kaufman | 71—64 |
| 2,943,928 | 7/1960 | Guth | 71—64 |
| 2,951,755 | 9/1960 | Joffe | 71—64 |
| 3,070,435 | 12/1962 | Reusser et al. | 71—64 |

FOREIGN PATENTS 589,926  12/1959  Canada.

DONALL H. SYLVESTER, *Primary Examiner.*

ANTHONY SCIAMANNA, *Examiner.*